United States Patent [19]

Robertson et al.

[11] 4,052,737
[45] Oct. 4, 1977

[54] METHOD AND APPARATUS UTILIZING BAUDOT CODE FOR CATEGORIZING AND SELECTIVELY DISTRIBUTING INFORMATION TO A PLURALITY OF UTILIZATION UNITS

[75] Inventors: Bruce W. Robertson, Salt Lake City; Pryce Neilson Hales, Centerville, both of Utah

[73] Assignee: Com Tel, Inc., Salt Lake City, Utah

[21] Appl. No.: 703,953

[22] Filed: July 9, 1976

[51] Int. Cl.² .................. H04N 7/10; H04L 15/00; G08B 23/00
[52] U.S. Cl. ............................ 358/86; 178/3; 340/324 AD
[58] Field of Search ............ 358/86, 85; 340/324 AD, 340/324 A, 152 R; 178/26 A, 4, 3, 113; 325/308

[56] References Cited

U.S. PATENT DOCUMENTS

| 2,548,446 | 4/1951 | Preston et al. | 178/4 |
| 3,909,818 | 9/1975 | Dalke et al. | 340/324 AD |

Primary Examiner—John C. Martin
Attorney, Agent, or Firm—Criddle, Thorpe & Western

[57] ABSTRACT

Disclosed is a method and apparatus for selectively distributing on a multiple channel television system information previously transmitted and received in the Baudot code. The transmitted information is encoded into a sequence of Baudot characters to include a combination of figure shift and/or letter shift characters which identifies the category or type of information contained in the sequence. Upon receipt, the sequence is decoded to determine the category of information contained therein and then the information is applied to one of a plurality of storage areas in memory, with the particular storage area selected being dependent upon the determination of the information category. After an information sequence has been received, decoded and stored in one of the storage areas, it is then applied to one or more selected channels of the multiple channel television system for display on television receivers tuned to those selected channels. Control circuitry is provided for selectively applying information from any of the storage areas in memory to any of the channels of the multiple channel television system.

12 Claims, 3 Drawing Figures

METHOD AND APPARATUS UTILIZING BAUDOT CODE FOR CATEGORIZING AND SELECTIVELY DISTRIBUTING INFORMATION TO A PLURALITY OF UTILIZATION UNITS

BACKGROUND OF THE INVENTION

This invention relates to a method and apparatus for utilizing the Baudot code to identify and categorize different kinds of information and for selectively distributing the information, dependent upon its categorization, to various utilization units or destinations, such as channels of a multiple television system.

New wire services have for years distributed news information from central locations to numerous wire service subscribers over the telephone network or other transmission facilities. Such news information, for example, is distributed on a substantially continuous basis to subscribing newspapers, radio stations, and television stations. The news information is transmitted in series with the various kinds of news stories, such as sports, world news, national news, financial and business news, etc., being intermixed. Fairly recently, cable television systems have begun to subscribe to the news wire services and to make available to their subscribers one or more television channels used principally for displaying the latest news information as received from the wire services. Of course, the news displayed would be an intermix of the news received from the news wire services unless some type of editing were performed by the cable system operator prior to distribution to the subscribers.

It has been found desirable by cable system operators to offer to subscribers more channels dedicated to displaying specific kinds or categories of news such as stock price information, weather news, etc. One way of offering this service would be for the cable sytem operator to provide a person or persons to monitor the news as it was received from the wire services and then regenerate this news in the categories desired for distribution to the cable sytem subscribers. Of course, this would be expensive and would create a delay in getting the information to the subscribers.

An alternative suggestion for distributing different categories of news over certain dedicated television channels has been proposed in U.S. Pat. No. 3,909,818. In the system disclosed in this reference, news information received from various sources is purportedly edited in some fashion by a general purpose digital computer and then distributed to various television channels depending upon the nature of the news. It could be expected that the separation of news information according to subject matter by some type of computer processing of the news texts would be quite complicated and costly and subject to error in accurately delimiting the different subject matter.

SUMMARY OF THE INVENTION

It is an object of the present invention to provide a simple and inexpensive method and apparatus for categorizing and selectively distributing information to a plurality of destinations.

It is another object of the present invention to provide such a method and apparatus which utilizes the code currently used by wire services, the Baudot Code, for categorizing the different kinds of information.

It is a further object of the invention to provide such a method and apparatus in which the coding of the information categories will not adversely affect existing receiving equipment to which the information may be sent.

The above and other objects of the invention are realized in a specific illustrative embodiment which includes a receiver for receiving Baudot encoded information sequences, in which the sequences include coded combinations of figure shift and/or letter shift Baudot characters for identifying the types or categories of information contained in the sequences, a decoder for decoding the combinations of figure shift and/or letter shift characters to determine the categories of information contained in the sequences, and apparatus for applying the information contained in the sequences to selected storage areas in a memory. The storage area selected for storing particular information is dependent upon the category of the information as determined by the decoder. Also included is apparatus for applying the information stored in the storage areas to selected utilization units or destinations, such as channels of a multiple channel television system.

As an example of the method of the present invention, sports information received might be stored in a certain storage area and then applied to a particular television channel for distribution over that channel to subscribers of a multiple channel television system. World and national news might similarly be stored in a different storage area for subsequent application to a different channel of the multiple channel television system. By employing a combination of figure shift and/or letter shift Baudot characters, existing printers which now receive wire service information would neither print the category identifying characters nor take any undesired action as a result of receiving the characters.

BRIEF DESCRIPTION OF THE DRAWINGS

The above and other objects, features and advantages of the present invention will become apparent from a consideration of the following detailed description presented in connection with the accompanying drawings in which.

DETAILED DESCRIPTION

Figure 1:
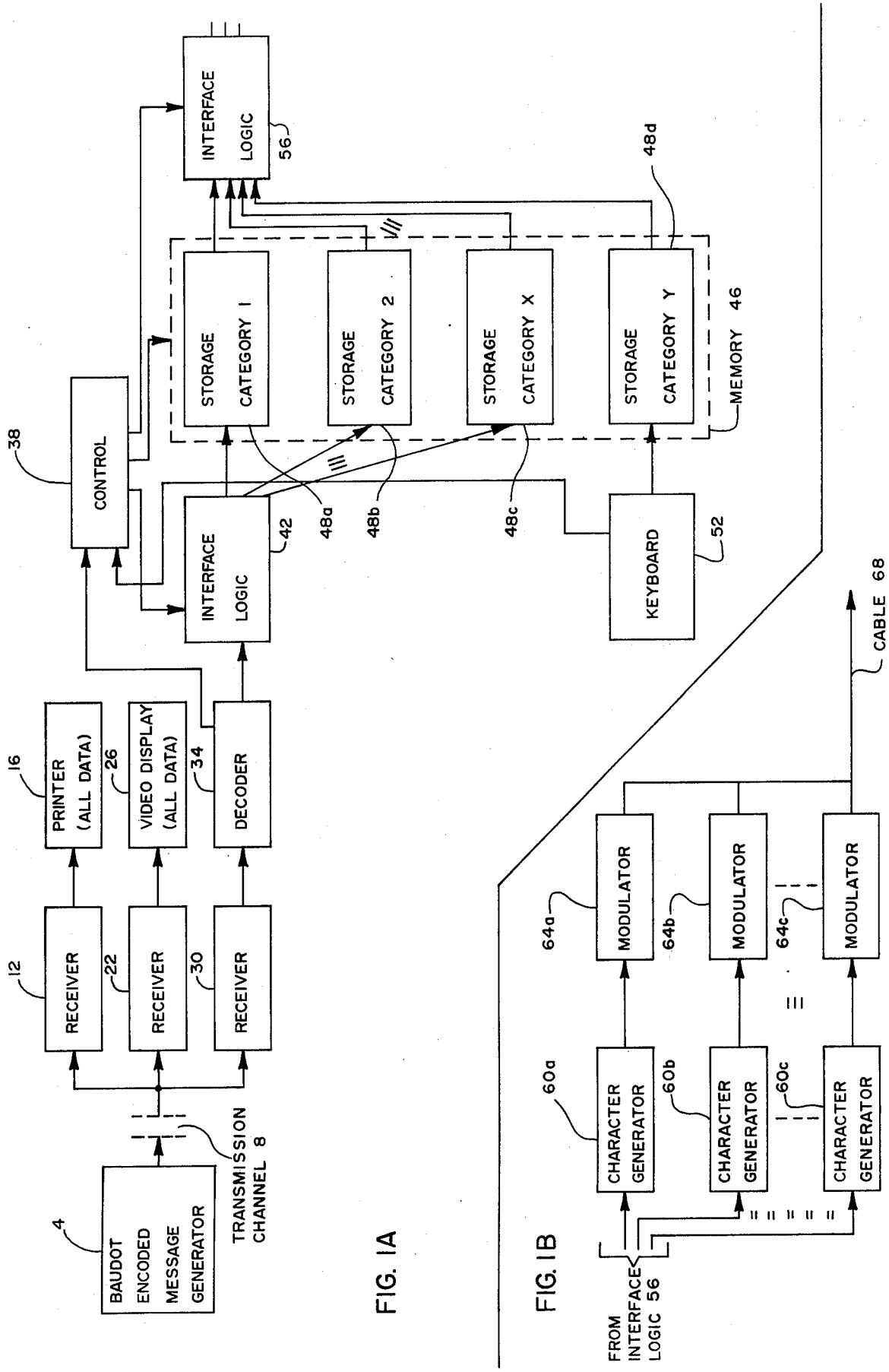
FIGS. 1A and 1B show a generalized multiple channel television system including apparatus for selectively distributing information over the system in accordance with the present invention.

Before describing the apparatus and method of the present invention, a brief description will be given of what is known as the Baudot code. This code is utilized by wire services (including the Associated Press News Wire Service, United Press International News Wire Service NOAA Weather, and commodity markets) to transmit news information over a communication system to subscribers such as newspapers, radio stations and television stations. The Baudot code is a so-called five level code in which each data word or character consists of five bits (binary digits). Of course, a five level code allows for $2^5 = 32$ different characters. If each character were assigned to represent a different letter of the alphabet and a different one of the numerals 1 through 0, then of course there would be insufficient characters in the Baudot code to represent all of the letters and numerals. This problem is overcome in the Baudot code by providing a "letter shift" character and a "figure shift" character to indicate that the data words or characters following these characters are letters of the alphabet and numerals respectively. With this arrangement, some of the Baudot code characters used to represent letters of the alphabet can also be used to represent numerals with such "common" characters being distinguishable by whether a "letter shift" character or "figure shift" character preceded the "common" character. All this is well known in the communication art.

Baudot characters are also used to represent a space (between words), the period (which appears at the end of sentences), line feed (which triggers currently used printer devices to advance one line forward), and carriage return (which causes currently used printer devices to return to the left margin of a page on which received information is being printed). However, there are no characters provided in the Baudot code for indicating such things as "start of text", "end of text", "end of transmission", etc., as there are with the well known ASCII code.

As indicated earlier, it has been found advantageous to separate different kinds or categories of information so that a certain category or categories may be distributed over a particular channel of a cable television system and so that other categories may be distributed over different channels, etc. In accordance with the present invention, information transmitted by wire services is first coded to identify a category into which each news story falls. This coding is carried out with the Baudot code in such a fashion that currently used printer devices effectively ignore the category code information and thus are not caused to print this information (which would be of no use to a subscriber such as a newspaper) or take any other undesired action. In order to provide such coding, letter shift and figure shift characters of the Baudot code are utilized to identify the different categories of information.

A variety of combinations of letter shift and figure shift characters could be adopted to identify categories of information, the number of such characters needed being dependent upon the number of categories to be identified. An illustrative coding scheme for identifying exemplary categories and also for identifying certain other control actions, which will hereinafter be explained, is given in Table 1 below.

TABLE 1

| Categories and Control Information Represented | Illustrative Coding | | | | | |
|---|---|---|---|---|---|---|
| Categories: | | | | | | |
| Financial News | LS | LS | LS | LS | LS | FS |
| State News | LS | LS | LS | LS | FS | LS |
| General News | LS | LS | LS | LS | FS | FS |
| Sports | LS | LS | LS | FS | LS | LS |
| Stock Quotations | LS | LS | LS | FS | LS | FS |
| Other | LS | LS | LS | FS | FS | LS |
| Control Information: | | | | | | |
| Start of Heading | CR | LS | CR | LS | FS | |
| End of Page | LF | CR | LF | LS | SP | |
| End of Page - Continue | SP | LF | CR | LF | LS | |
| End of Category | LF | FS | CR | LF | LS | |

LEGENDS
LS — Letter Shift
FS — Figure Shift
CR — Carriage Return
LF — Line Feed
SP — Space The "start of heading" control code would be used at the beginning of each transmission by a news wire service, the "end of page" control code would be used to indicate the end of a story, but not necessarily the end of a category, the "end of page - continue" control code would be used to indicate that more of the same story is to follow, and the "end of category" control code would be used to indicate that all the information in the category initially designated has been transmitted. It should be understood that a variety of other control information could be provided and that the control information, as well as the category designations, shown in Table 1, are given only for purposes of illustration.

Referring now to FIGS. 1A and 1B, there is shown a multiple channel television system adapted to distribute various categories of information to selected television channels. News information, which might include sports stories, world news, financial news, etc., is encoded by a Baudot encoded message generator 4 which may be either a teletypewriter operated by a person or a computer programmed to encode the news information so that each kind or category of information is designated by a combination of letter shift and/or figure shift characters of the Baudot code. Each information sequence would thus begin with "start of heading" control information (see Table 1), followed by a category code composed of letter shift and/or figure shift characters identifying the category of information to follow, and then the information or news story itself. Since news information is transmitted by wire services, a so-called "page" at a time, either an "end of page" code will be transmitted at the end of the news story (if the news story is not greater than a "page" in length), an "end of page - continue" code will be transmitted at the end of the page (if the story is greater in length than a page), or an "end of category" code will be transmitted at the end of the news story (if no more news in the category in question is to follow).

The Baudot encoded information is applied by the message generator 4 to a transmission channel 8 for transmission to receiving stations of cable television systems. The transmission channel 8 could be the telephone network, a cable system, a microwave transmission system, or other type of communication system used by the wire services.

The transmitted information sequences might be received by a receiver 12 for application to a conventional printer device 16. In this case, the received news information would simply be printed by the printer 16 in the order received as is presently done with many wire service subscribers. The transmitted information sequences might be received by another receiver 22 for application to a video display device 26 such as a cathode ray tube. Again, the information received would be displayed on the video display device 26 in the order received. The receivers 12 and 22 and the printer device 16 and video display device 26 are shown in FIG. 1A to represent conventional equipment of wire service subscribers.

In accordance with the present invention, each transmitted information sequence is also received by a receiver 30 of a cable television system and applied to a decoder 34. The decoder 34 decodes the "start of heading" code and category code of the received information sequence and signals a control unit 38 as to the category of news information contained in the sequence. The decoder 34 is simply adapted to recognize the different category codes and signal the control unit 38 accordingly. The decoder 34 then applies the subsequently received information to interface logic 42 which, under control of the control unit 38, applies the information to a memory 46. In particular, the interface logic 42 directs the information to one of the storage areas 48a through 48c of the memory 46 as directed by the control unit 38. For example, if the category of the information sequence being received is determined to be sports information, the control unit 38 might direct the interface logic 42 to apply the information to the storage area designated "storage category 1". Likewise, world news information might be applied to "storage category 2", etc.

The control unit 38 might simply be a hard wired circuit adapted to respond to the information received from the decoder 34 by signaling the interface logic 42 to apply subsequently received information to one of the storage areas indicated. Alternatively, the control unit 38 could be a programmable microprocessor such as the 4004 microprocessor produced by Intel. The memory 46 might simply be a conventional magnetic core memory with different portions thereof dedicated to receive and store the different categories of information. Alternatively, the memory 46 might be composed of separate memory devices with each memory device being dedicated to receive and store a particular category of news information.

Also coupled to the memory 46 is a keyboard device 52 having a keyboard similar to that found on a typewriter for producing information for storage in a storage area designated 48d of the memory. Keyboard input devices suitable for producing such information are well known in the art. Whenever information is produced on the keyboard 52 and applied to the storage area 48d, a signal is applied to the control unit 38 from the keyboard 52 to indicate that information is being applied by the keyboard to the memory 46. Also, control information previously described would be applied by the keyboard 52 to the control unit 38. The type of information supplied via the keyboard 52 might illustratively be local news stories, local advertising, etc., which would otherwise not be available for distribution to the subscribers of the multiple channel television system.

The decoder 34 also recognizes various control codes received such as the "end of page" code previously described, etc., and signals the control unit 38 accordingly. When the control unit 38 receives a signal (either from the decoder 34 or keyboard 52) indicating that an "end of page" code has been received, then it signals interface logic 56 to apply the news information just received and stored in memory 46 to a selected one of the character generators 60. For example, information received and stored in storage category 1 of the memory 46 might be applied to character generators 60a and 60c, whereas information received and stored in storage category 2 might be applied to character generator 60b. The control unit 38 would simply signal the interface logic 56 to apply the information from each of the storage categories to preselected ones of the character generators 60. The character generators 60 are simply conventional video character generators for producing video characters designated by applied information.

The character generators 60 apply the produced video characters to corresponding modulators 64 which then applies the characters to a cable 68 for transmission to television receivers of the subscribers of the cable system. Each character generator and corresponding modulator, of course, represent a television channel to which the subscribers may tune by appropriate adjustments of their television receivers. The modulators 64 simply modulate the video characters received from the character generators onto signal carriers representing the television channels in question.

In the manner described, news information produced by the message generator 4 is coded in the Baudot code to identify the different news categories and this coding is then utilized by the decoder 34 and control unit 38 to store the information in different areas of the memory 46. The different categories of information are then supplied to selected television channels of the cable television system represented by the character generators 60 and corresponding modulators. The subscribers to the cable television system may thus select the kind of information they desire to view by simply tuning to the television channel carrying that type of information.

Figure 2:
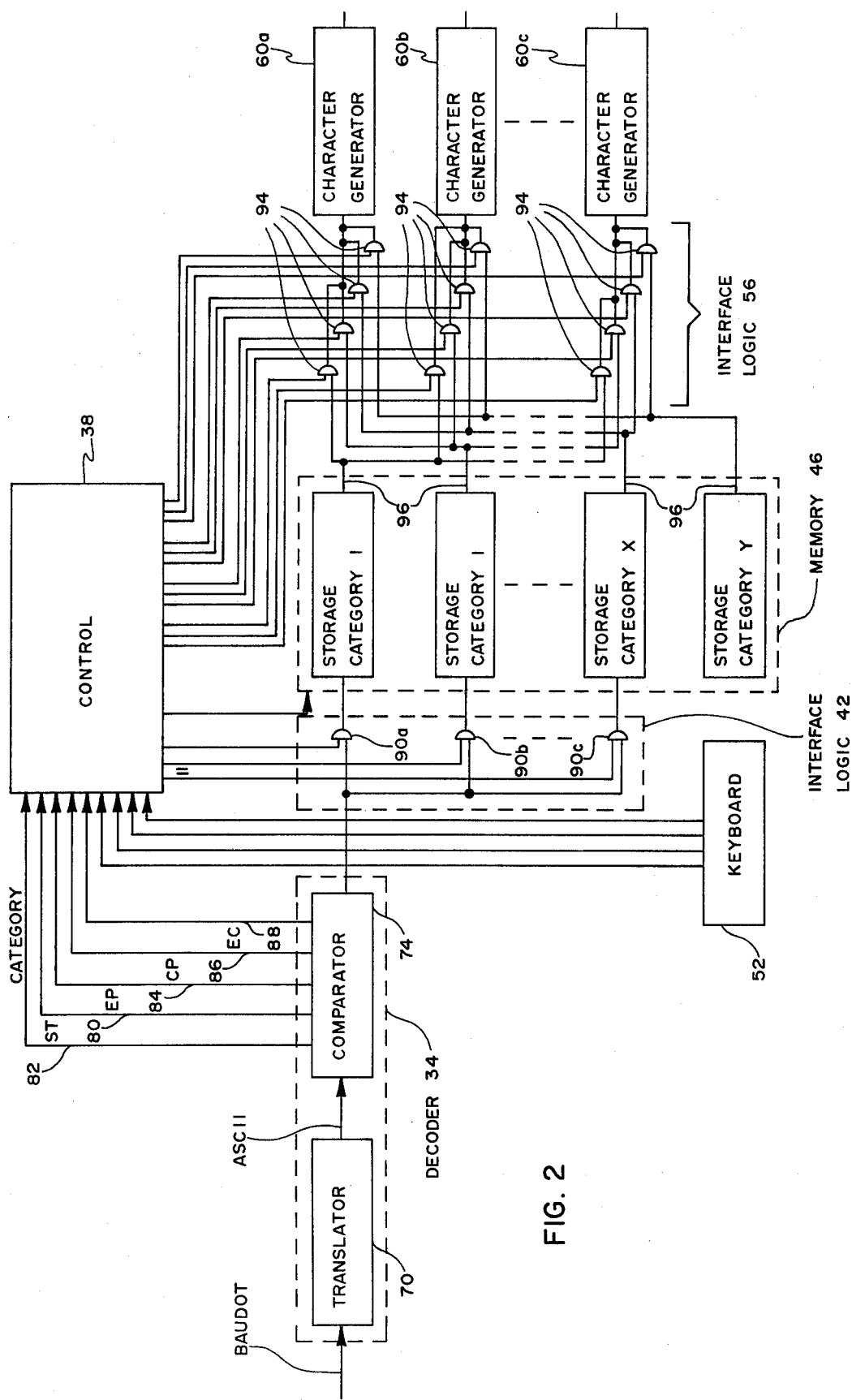
FIG. 2 shows one illustrative embodiment of the decoder and interface logic of FIG. 1A.

FIG. 2 shows one illustrative embodiment of the decoder 34, interface logic 42, and interface logic 56. The decoder 34 might simply consist of a translator 70 for translating the Baudot encoded information into ASCII coded information for application to a comparator 74. Such translation is considered desirable since there is available much equipment capable of processing ASCII encoded information. The ASCII encoded information applied to the comparator 74 is simply matched against permanently stored information to ascertain the presence of the different category codes and control codes. When a "start of heading" control code is recognized, the comparator 74 signals the control unit 38 via lead 80. The comparator 74 next signals the control unit 38 via lead 82 identifying the particular category of the information to be received. Recognition of the "end of page", "end of page - continue", and "end of category" codes are indicated to the control unit 38 by the comparator 74 via leads 84, 86 and 88 respectively. The keyboard 52 similarly signals the control unit 38 to indicate "start of heading", "end of page", "end of page - continue" and "end of category".

The control unit 38 responds to the identification of the information category by enabling one of the AND gates 90 so that the information in question will be applied to a particular one of the storage areas in the memory 46. The selected AND gate is enabled after receipt of the "start of heading" code and category code so that only the news information is applied to the memory. When it is time to apply the information from one of the storage areas to a particular character generator or generators 60, the control unit 38 enables one or more of the AND gates 94 and then signals the storage area in question to apply the stored information to its corresponding output lead 96. The information will then be applied only via the enabled AND gates 94 to selected character generators 60 for transmission to cable television systems subscribers.

It is to be understood that the above-described arrangement is only illustrative of the application of the principles of the present invention. Numerous modifications and alternative arrangements may be devised by those skilled in the art without departing from the spirit and scope of the present invention and appended claims are intended to cover such modifications and arrangements. For example, rather than distributing the categorized information to selected channels of a multiple channel television system, the information might be applied to selected printer devices or to transmission lines leading to such devices, or to a variety of other type alphanumeric display devices.

What is claimed is:

1. A method of selectively distributing information on a multiple channel television system including a. receiving a Baudot encoded information sequence, wherein the sequence includes a coded combination of figure shift and/or letter shift Baudot characters for identifying one of a plurality of different categories of information also contained in the sequence, b. decoding the combination of figure shift and/or letter shift characters to determine the category of the information contained in the sequence, c. applying the information contained in the sequence of one of a plurality of storage means, said one storage means being dedicated to store information of the category determined in the decoding step, and d. applying the information stored in said one storage means to a selected channel of the multiple channel television system for display on television receivers tuned to the selected channel.

2. A method as in claim 1 further including e. generating information on a keyboard device, f. applying the keyboard generated information to an additional storage means dedicated to store information generated on the keyboard device, and g. selectively applying the information stored in said additional storage means to one or more of the channels of the multiple channel television system for display on television receivers tuned to the selected channel.

3. A method as in claim 2 wherein steps (d) and (g) comprise selectively applying information from any of the storage means to any of the channels of the multiple channel television system.

4. A method as in claim 1 wherein step (a) comprises receiving a Baudot encoded information sequence, in which the sequence includes at the end thereof control information for identifying the end of the information in the identified category, and wherein step (d) comprises applying the information stored in said one storage means to said selected channel after receipt of the control information.

5. A method as in claim 1 further including receiving the Baudot encoded information sequence, and applying the sequence to a printer device for printing the information in the sequential order received.

6. Apparatus for selectively distributing information on a multiple channel television system comprising receiving means for receiving Baudot encoded information sequences which include coded combinations of figure shift and/or letter shift Baudot characters for identifying the category of information contained in each sequence, decoding means coupled to the receiving means for decoding the coded combinations of figure shift and/or letter shift characters in the received information sequences to determine the category of information contained in each sequence, storage means including a plurality of storage locations for storing information applied thereto, first logic means coupled to the decoding means for applying the information contained in the information sequences to storage locations in the storage means selected according to the category of such information as determined by the decoding means, and second logic means for applying the information stored in each storage location in the storage means to a predetermined channel of the multiple channel television system.

7. Apparatus as in claim 6 wherein said receiving means is adapted to receive a Baudot encoded information sequence which includes at the end thereof control information for indicating the end of the sequence, wherein said decoding means is adapted to decode the control information to ascertain the end of the sequence, and wherein said first and second logic means includes control means responsive to said decoding means determining the category of information in an information sequence for producing first control signals corresponding to the category, and responsive to said decoding means ascertaining the end of the sequence for producing second control signals also corresponding to the category, first interface logic means responsive to said first control signals for applying the information in the received sequence from the decoder to a selected storage location in the storage means, and second interface logic means responsive to said second control signals for applying the information stored in the selected storage location to the predetermined channel of the multiple channel television system.

8. Apparatus as in claim 6 further comprising a keyboard device for applying information to a predetermined storage location in said storage means, and wherein said second logic means is adapted to apply the information stored in said predetermined storage location to a channel of the multiple channel television system.

9. Apparatus as in claim 6 wherein said second logic means is adapted to apply informtion stored in any of the storage locations to any of the channels of the multiple channel television system.

10. A method of selectively distributing information to a plurality of information utilization units including a. receiving a Baudot encoded information sequence in which the sequence includes a coded combination of figure shift and/or letter shift Baudot characters for designating the subject matter of the information contained in the sequence, where such information relates to one of a plurality of different subject matters, b. decoding the combination of figure shift and/or letter shift characters to determine the subject matter of the information contained in the sequence, c. applying the information contained in the sequence to one of a plurality of storage means, said one storage means being dedicated to storing information of the subject matter determined in step (b), and d. applying the information from said one storage means to one or more selected utilization units dedicated to receive information of the subject matter determined in step (b).

11. Apparatus for selectively distributing information to a plurality of information utilization units comprising receiving means for receiving Baudot encoded information sequences which include coded combinations of figure shift and/or letter shift Baudot characters for designating the subject matter of information contained in the sequence, decoding means coupled to said receiving means for decoding the coded combinations of figure shifts and/or letter shift characters in the received information sequences to determine the subject matter of the information contained in each sequence, storage means including a plurality of storage locations for storing information applied thereto, and logic means coupled to the decoding means and storage means for applying the information contained in the sequences to storage locations in the storage means, where such storage locations are selected according to the subject matter of such information as determined by the decoding means, and for applying the information stored in each storage location to a predetermined one or more of the utilization units.

12. A method of distributing information to a plurality of destinations which are selected according to the subject matter of the information, said method including a. encoding an information sequence into a Baudot code to include a combination of letter shift and/or figure shift Baudot characters for identifying the subject matter of the information in the sequence, b. transmitting the Baudot encoded information sequence to a receiving station, c. decoding, at the receiving station, the combination of letter shift and/or figure shift characters to determine the subject matter of the information in the sequence, and d. applying the information to one or more of the destinations selected according to the subject matter of the information as determined in step (c).

* * * * *